United States Patent
Souers

(10) Patent No.: US 11,162,566 B2
(45) Date of Patent: Nov. 2, 2021

(54) METHOD AND APPARATUS OF A CONNECTION BETWEEN A PILOT HUB AND SEAL PLATE

(71) Applicant: SCHAEFFLER TECHNOLOGIES AG & CO. KG, Herzogenaurach (DE)

(72) Inventor: Long Souers, North Canton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 4 days.

(21) Appl. No.: 16/201,504

(22) Filed: Nov. 27, 2018

(65) Prior Publication Data

US 2020/0166110 A1 May 28, 2020

(51) Int. Cl.
*F16H 45/02* (2006.01)

(52) U.S. Cl.
CPC ....... *F16H 45/02* (2013.01); *F16H 2045/021* (2013.01)

(58) Field of Classification Search
CPC ................................................ F16H 2045/021
See application file for complete search history.

(56) References Cited

U.S. PATENT DOCUMENTS

| 5,737,836 A * | 4/1998 | Finn ...................... B21J 9/025 |
| | | 29/557 |
| 6,258,001 B1 * | 7/2001 | Wakuta ................... B60K 6/36 |
| | | 475/5 |
| 7,143,880 B2 * | 12/2006 | Tsuzuki ................. F16H 45/02 |
| | | 192/3.3 |
| 7,841,174 B2 | 11/2010 | Van Sickle |
| 7,984,800 B2 * | 7/2011 | Frey ..................... F16H 45/02 |
| | | 192/113.5 |
| 9,200,685 B2 * | 12/2015 | Ushio .................... F16H 45/02 |
| 9,556,944 B2 * | 1/2017 | Sekiguchi .............. F16H 45/02 |
| 2009/0266665 A1 | 10/2009 | Huegel et al. |
| 2016/0017971 A1 * | 1/2016 | Sayre .................... F16H 45/02 |
| | | 192/3.29 |
| 2018/0106350 A1 | 4/2018 | Hilty et al. |

* cited by examiner

*Primary Examiner* — F Daniel Lopez
(74) *Attorney, Agent, or Firm* — Dickinson Wright PLLC

(57) ABSTRACT

A torque converter includes a cover, an impeller including an impeller shell connected to the cover, a turbine including a turbine shell and at least one turbine blade fixed to the turbine shell, a seal plate, wherein the seal plate located axially between the cover and the turbine shell, and a pilot hub connected to the seal plate utilizing a spline connection.

19 Claims, 4 Drawing Sheets

METHOD AND APPARATUS OF A CONNECTION BETWEEN A PILOT HUB AND SEAL PLATE

TECHNICAL FIELD

The present disclosure relates to a pilot hub and seal plate of a torque converter.

BACKGROUND

A pilot hub and a seal plate may typically have a welded connection between to join the two parts. A welded connection may require additional work and require shim plates to secure the connection.

SUMMARY

According to one embodiment, a torque converter is disclosed that comprises a cover, an impeller including an impeller shell connected to the cover, a turbine including a turbine shell and at least one turbine blade fixed to the turbine shell, a seal plate, wherein the seal plate is located axially between the cover and the turbine shell, and a pilot hub is connected to the seal plate utilizing a spline connection.

According to a second embodiment, a torque converter is disclosed that includes a seal plate located axially between a cover and a turbine shell of the torque converter, and a pilot hub connected to the seal plate utilizing a spline connection.

According to a third embodiment, a method of connecting a seal plate and pilot hub in a torque converter is disclosed that includes stamping splines on an inner diameter of the seal plate, pressing the inner diameter of the seal plate with the outer diameter of the pilot hub, wherein the pressing creates a spline connection of the seal plate and the pilot hub, and staking the seal plate with the pilot hub to secure the spline connection.

DETAILED DESCRIPTION

Figure 1:
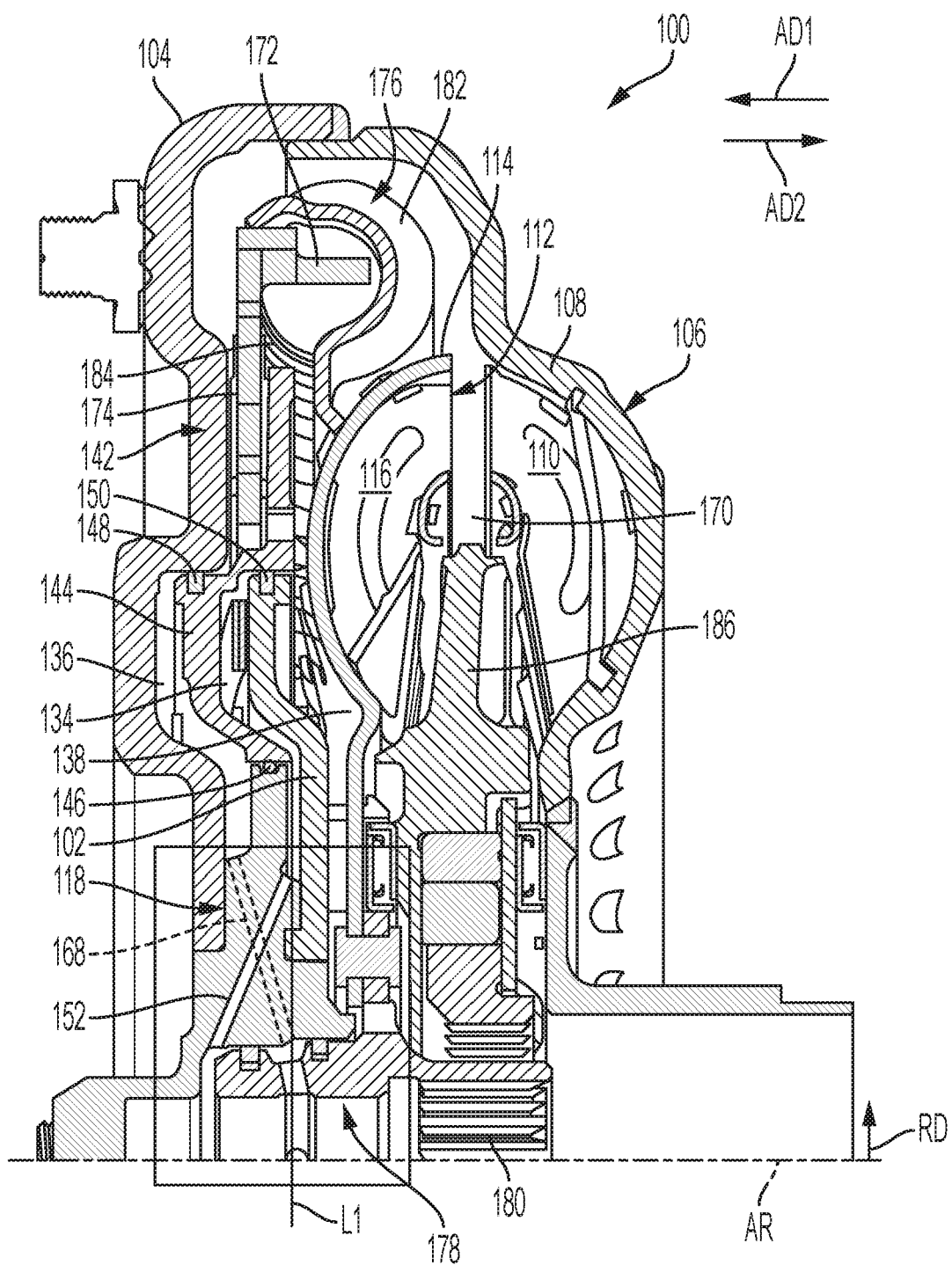
FIG. 1 is a partial cross-sectional view of torque converter 100 with a staking connection with the seal plate 102.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In an embodiment, rather than utilizing a typical welded connection between pilot hub and seal plate, an interference fit (e.g. shrink fit) and staked connection between the outer diameter (OD) of the pilot hub and inner diameter (ID) of seal plate is disclosed. To apply spline cutting, the splines/wavy shaped teeth can be stamped into ID of seal plate. The splines/wavy shaped teeth may be hardened and then pushed onto the pilot hub to form opposite, complimentary splines/wavy shaped cavities in the OD of the pilot hub. In an alternative embodiment, the splines may be located on a hardened OD of the pilot hub and pushed into a softer seal plate to form the opposite spline/wavy shaped cavities. Thus, the splines/wavy shapes on the OD of pilot hub cavities may be created first (which is a forged or casted part and made externally), and then assembled to the seal plate to form the tight connections between them. A spline connection may provide a better seal and prevent fluid from transferring than a traditional weld where porosities may occur. To apply a shrink fit, the seal plate may be heated up and placed onto the pilot hub. In such an embodiment, no wavy shapes or splined teeth are designed into the ID of seal plate and OD of pilot hub. This interference fit formed joint is to carry a lower torque than spline/wavy connection and act as a tangential constrain between them. The staking may be applied afterwards to axially constrain the seal plate by plastically deforming some materials of the OD of pilot hub onto the ID of the seal plate. In another embodiment, the inner diameter (ID) regions of the seal plate may be thickened similar to the outer diameter (OD) regions for receiving different levels of machining in the side touching the shim plates/pilot hub. Such thickening and machining at the various levels may disrupt the need for shim plates to be used.

FIG. 1 is a partial cross-sectional view of torque converter 100 with a staking connection with the seal plate 102. While a four-pass torque converter is shown, any type of torque converter may be utilized, including a three-pass torque converter. Torque converter 100 may include an axis of rotation AR; seal plate 102; cover 104 arranged to receive torque; impeller 106 including impeller shell 108 non-rotatably connected to cover 104, and at least one impeller blade 110 fixed to impeller shell 108; turbine 112 including turbine shell 114 and at least one turbine blade 116 fixed to turbine shell 114; hub 118; and a spline connection that may connect the pilot hub 118 to seal plate 102. Line L1, orthogonal to axis of rotation AR, passes through, in sequence, hub 118, seal plate 102, and hub 118.

Torque converter 100 includes pressure chambers 134, 136 and 138. Chamber 134 is bounded, at least in part, by plate 102 and hub 118. In an example embodiment: chamber 136 is bounded, at least in part, by cover 104 and hub 118; and chamber 138 is bounded, at least in part, by seal plate 102 and turbine shell 114.

Torque converter 100 includes lock-up clutch 142 including axially displaceable piston plate 144. Chambers 134 and 136 are bounded at least in part by piston plate 144. Piston plate 144 is displaceable, in response to pressure in pressure chamber 134 (increasing fluid pressure in chamber 134), in axial direction AD1 to close clutch 142 and non-rotatably connect piston plate 144 to cover 104. Piston plate 144 is displaceable, in response to pressure in pressure chamber 136 (increasing fluid pressure in chamber 136), in axial direction AD2, opposite axial direction AD1, to open clutch 142 so that piston plate 144 is rotatable with respect to cover 104. By "non-rotatably connected" elements we mean that: whenever one of the elements rotates at a particular speed, all of the elements rotate at that particular speed; and relative rotation between the elements is not possible. Axial or radial displacement of the elements with respect to each other is possible.

Torque converter 100 includes: seal 146 sealed against hub 118 and piston plate 144; seal 148 sealed against piston plate 144 and cover 104; and seal 150 sealed against seal plate 102 and piston plate 144. In an example embodiment, hub 118 includes at least one channel 152 extending from radially inwardly-facing surface of hub 118 to chamber 134. Chamber 134 is sealed from the remainder of torque converter 100, for example from chambers 136 and 138 with the exception of channel(s) 152. That is, the only path for fluid to enter or exit chamber 134 is through channel(s) 152. For example, seal 146 and 148 seal chamber 134 from chamber 136 and seal 150 seals chamber 134 from chamber 138.

Hub 118 includes a first surface extending in the radial direction (RD), and a second surface extending from the first surface in the first axial direction (AD1). An indentation is formed by the first and second surfaces of hub 118. As shown in FIG. 1, the first and second surfaces may be in direct contact with corresponding surfaces of the cover 104.

In an example embodiment, hub 118 includes at least one channel 168 extending from the radially inwardly-facing surface of hub 118 to chamber 136. Chamber 136 is sealed from the remainder of torque converter 100, for example from chambers 134 and 138 with the exception of channel(s) 168. That is, the only path for fluid to enter or exit chamber 136 may be through channel(s) 168. For example, seal 146 seals chamber 136 from chamber 134 and seal 148 seals chamber 136 from chamber 138. Torque converter 100 includes space, or torus, 170 formed by impeller shell 108 and turbine shell 114. Chamber 138 includes space 170.

In an example embodiment, clutch 142 includes drive plate 172 and friction material 174 axially located between cover 104 and piston plate 144. In an example embodiment, torque converter 100 includes torsional vibration damper 176 and output hub 178. Hub 178 is non-rotatably connected to turbine shell 114 and is arranged to non-rotatably connect to an input shaft (not shown) for a transmission, for example, via spline teeth 180. Damper 176 includes spring retainer plate 182 and at least one spring 184. Plate 182 is non-rotatably connected to turbine shell 114 and at least one spring 184 is engaged with drive plate 172 and plate 182.

Torque converter 100 operates as follows. For a torque converter mode, clutch 142 is open so that piston plate 144 is rotatable with respect to cover 104 and torque from cover 104 is transmitted to impeller shell 108. A hydraulic connection of impeller 106 and turbine 112 through stator 186 transmits torque from turbine shell 114 to output hub 178 through turbine shell 114. To open clutch 142, fluid pressure in chamber 136 is increased to be greater than fluid pressure in chamber 134. Pressure in chamber 134 may be decreased to facilitate this differential.

For a lock-up mode for torque converter 100, clutch 142 is closed so that drive plate 172 and piston plate 144 are non-rotatably connected to cover 104. Torque from cover 104 is transmitted to output hub 178 through drive plate 172, spring(s) 184, plate 182, and turbine shell 114. To close clutch 142, fluid pressure in chamber 134 is increased to be greater than fluid pressure in chamber 136. Pressure in chamber 136 may be decreased to facilitate this differential.

Advantageously, seal plate 102, hub 118, and a spline connection that also includes staking may address the problem of excess tension when connecting a sealing plate, for example for a four-pass torque converter, to a pilot hub for the four-pass torque converter. For example, fluid pressure in a chamber may exert a force on seal plate 102 in direction AD2. However, significant portions of force F may be diverted. For example, the bending stress may be absorbed by a remainder of the seal plate 102 that absorbs portions of force. As a result, the resultant tension may be reduced.

Figure 2A:
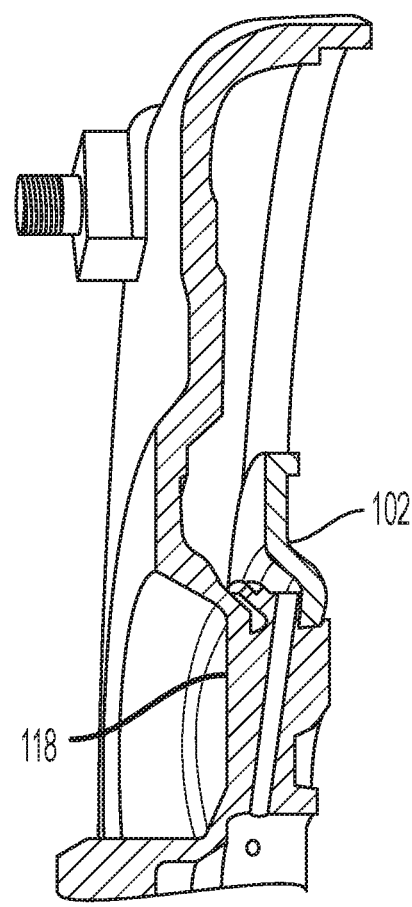
FIG. 2A shows an example of a detailed top-view of a spline and staking connection between the pilot hub and seal plate.
Figure 2B:
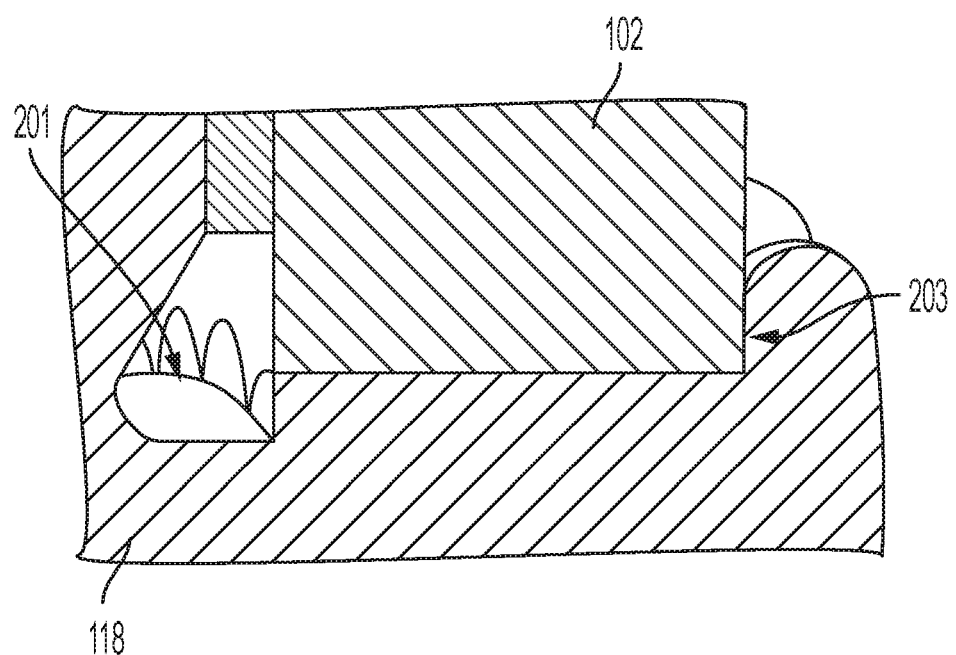
FIG. 2B shows a magnified view of the spline connection and staking connection.

FIG. 2A shows an example of a detailed top-view of a spline 201 and staking connection 203 between the pilot hub 118 and seal plate 102. FIG. 2B shows a magnified view of the spline connection 201 and staking connection 203. The pilot hub 118 and seal plate 102 may be connected via a spline 201 and a staking connection 203. A shrink fit and staking connection 203 may be utilized when the torque transmitted is smaller than the friction force times the radius of the press fitted interface due to clamping of the stakes. Thus, when the torque transmitted is smaller than the friction force times the radius of the interface, a spline connection may be enough. However, if the torque transmitted is larger than the friction force times the radius of the connection, staking may provide more clamping force to counteract the torque. The spline connection 201 may be located at the outer diameter (OD) of the pilot hub 118 and inner diameter (ID) of the seal plate 102. The OD of the pilot hub 118 may include teeth or wavy, curved protrusions that extend out from the OD. In one embodiment, the teeth or protrusions may all be the same shape, but in another embodiment, they may be different shaped. The spline (e.g. teeth or waved protrusions) of the pilot hub 118 may be pressed/pushed against the ID of the seal plate to create a spline connection 201. By pressing the spline of the pilot hub 118 against the seal plate 102, cavities may be formed to interlock the splines and create a spline connection 201. To secure the spline connection 201, staking may occur between the pilot hub 118 and the seal plate 102 to join the pieces together.

In an alternative embodiment, the OD of the pilot hub 118 may not include teeth or wavy curves protruding out from the OD. Instead, the OD of the pilot hub 118 may include the cavities. Thus, the splines (e.g. the teeth or wavy curves) may be located on the ID of the seal plate 102. The teeth or wavy curves of the seal plate 102 may be pressed/pushed against the OD of the pilot hub 118 to create a spline connection 201. In one embodiment, the teeth or protrusions may all be the same shape, but in another embodiment, they may be different shaped. In an alternative embodiment, the cavities of the OD of the pilot hub 118 may be pressed/pushed against the ID of the seal plate 102 to create a spline connection 201. The spline connection 201 may be utilized to seal the fluid passage and transmit torque. In an alternative embodiment, a staking connection may be utilized for axial constrains. A ring stake surrounding the OD of the pilot hub may also be utilized to help seal the fluid passage as well.

In the production, the pilot hub 118 may be forged and machined. The pilot hub may be any material, including SAE1026 or another carbon steel. Thus, the splines can be included in the OD of the pilot hub when being forged. The seal plate may be made from another material that is different than that material of the pilot hub. The seal plate may be made from 045YLF or another high strength steel and stamped internally. Splines can be designed into the OD of pilot hub or ID of seal plate, and then the splines may be hardened before assembling the parts together to form the spline connection. The splines may be hardened by heat treating the splines, such as utilizing case hardening, which allows an outer layer of material to be harder than an inner layer. In an embodiment, the pilot hub may be softer than the seal plate. Staking is performed on OD of pilot hub to axially constrain seal plate.

In an alternative embodiment, the seal plate 102 may have varying thicknesses for corresponding areas of the pilot hub where shims are utilized to create an axial spacing between the seal plate and the pilot hub. For example, rather than utilizing shims to create an axial spacing between portions of the pilot hub and the seal plate, the seal plate may have varying thicknesses in the ID regions. For example, the thickness between various portions of the seal plate may vary at points of the ID regions, such as thickening variations of 0.3 mm; 0.45 mm; 0.6 mm; 0.75 mm; 0.90 mm; 1.05 mm; 1.2 mm; 1.35 mm; 1.5 mm; 1.65 mm. Thus, the ID regions of the seal plate may be thickened similarly to that of the OD regions that allows receiving different levels of machining in the side touching the pilot hubs in areas where the shim plates are typically used, thus allowing the shim plates to be removed. For example, if the pilot hub is 5.2 mm in depth where seal plate sits, the ID of the seal plate regions is thickened to 5.5 mm at OD regions, all the shim plate variations may be incorporated into the seal plate by machining it into different depths. When the variations are incorporated, the shims may be removed from utilization.

Figure 3:
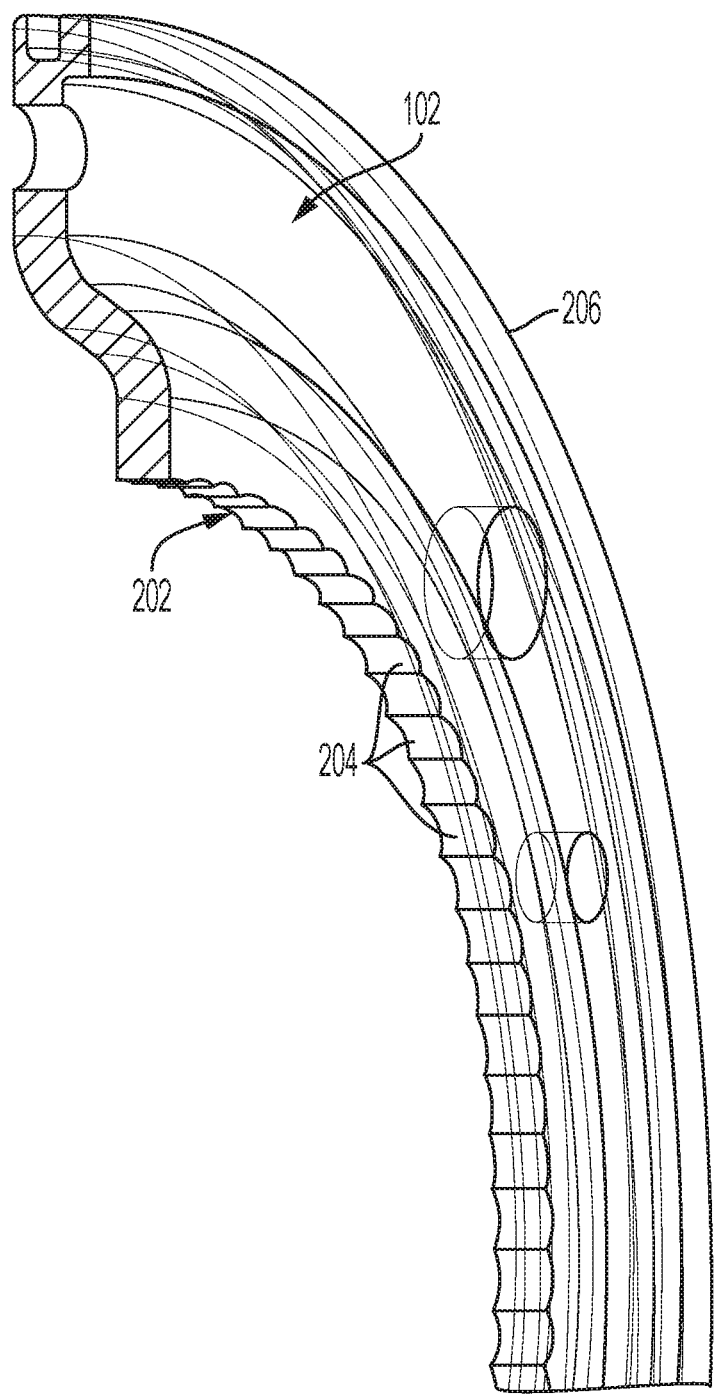
FIG. 3 shows a cut-away view facing the inner diameter of the seal plate.

FIG. 3 shows a cut-away view of the seal plate 102 facing the inner diameter 202. The seal plate may have an inner diameter 202 and an outer diameter 206. The inner diameter 202 may include a plurality of stamped splines 204 or wavy shaped splines. The splines 204 may vary in shapes or sizes. Furthermore, the splines 204 may be regularly or irregularly shaped along the inner diameter 202 of the seal plate 102. In an alternative embodiment, a shrink fit may be utilized rather than a spline connection. To establish a shrink fit, the seal plate may be heated and then dropped onto the pilot hub and then cooled to form the connection.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Parts List

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 torque converter
102 seal plate
104 cover
106 impeller
108 impeller shell
110 impeller blade
112 turbine
114 turbine shell
116 turbine blade
118 pilot hub
134 chamber
136 pressure chamber
138 chamber
142 clutch
144 piston plate
146 seal
148 seal
150 seal
152 channel
168 channel
170 space
172 drive plate
174 friction material
176 damper
178 output hub
180 spline teeth
182 spring retainer plate
184 spring
186 stator
201 spline connection
202 inner diameter
203 staking connection
204 splines
206 outer diameter

What is claimed is:

1. A torque converter, comprising:
a cover;
an impeller including an impeller shell connected to the cover;
a turbine including a turbine shell and at least one turbine blade fixed to the turbine shell;
a piston plate connected to the cover and located between the cover and the impeller shell, wherein the piston plate is configured to selectively engage a clutch;
a seal plate located axially between the piston plate and the turbine shell and connected to the piston plate; and
a pilot hub connected to the cover and the piston plate, wherein the pilot hub includes an outer portion in direct contact with both an inner-axial surface of the cover and a radial surface of the cover, wherein the pilot hub is connected to the seal plate utilizing a spline connection and a staking connection between an outer diameter of the pilot hub and an inner portion of the seal plate, wherein one or more splines are located on an inner diameter of the seal plate at the spline connection.

2. The torque converter of claim 1, wherein the spline connection includes pilot hub splines located on the outer diameter of the pilot hub.

3. The torque converter of claim 2, wherein the splines are rounded protrusions.

4. The torque converter of claim 1, wherein the pilot hub is made of a first material and the seal plate is made of a second material, wherein the first material and second material are different materials.

5. The torque converter of claim 1, wherein a first material of the pilot hub is harder than a second material of the seal plate.

6. The torque converter of claim 1, wherein the staking connection is a ring stake surrounding the outer diameter of the pilot hub.

7. The torque converter of claim 1, wherein the splines are heat treated splines.

8. The torque converter of claim 1, wherein the seal plate may include one or more regions of the inner portion of the seal plate with varying thickness.

9. The torque converter of claim 1, wherein the pilot hub is further connected to the seal plate via a press fit at the outer diameter of the pilot hub and inner portion of the seal plate.

10. The torque converter of claim 1, wherein the pilot hub is softer than the seal plate.

11. A torque converter, comprising:
a seal plate located axially between a cover and a turbine shell of the torque converter;
a piston plate connected to the cover and configured to selectively engage a clutch, wherein the piston plate is connected to the seal plate, wherein the seal plate is further located axially between the piston plate and the turbine shell; and
a pilot hub connected to the seal plate utilizing a spline connection and a staking connection between an outer diameter of the pilot hub and an inner portion of the seal plate, wherein the pilot hub is directly contacting and directly connected to the cover, and wherein the pilot hub and the cover form a boundary of a first chamber configured to displace the piston plate in response to pressure in the first chamber.

12. The torque converter of claim 11, wherein the spline connection includes splines located on the outer diameter of the pilot hub.

13. The torque converter of claim 12, wherein the pilot hub and the seal plate are made of a same material.

14. The torque converter of claim 11, wherein the spline connection includes teeth located on the inner portion of the seal plate, wherein the teeth are of a same shape.

15. The torque converter of claim 11, wherein the spline connection includes splines located on the pilot hub and the splines are engaged with the seal plate.

16. The torque converter of claim 11, wherein one or more splines are located on the inner portion of the seal plate.

17. A torque converter, comprising:
a cover;
an impeller including an impeller shell connected to the cover;
a turbine including a turbine shell and at least one turbine blade fixed to the turbine shell;
a piston plate connected to the cover and located between the cover and the impeller shell, wherein the piston plate is configured to selectively engage a clutch;
a seal plate located axially between the piston plate and the turbine shell and connected to the piston plate; and
a pilot hub connected to the cover and the piston plate, wherein the pilot hub includes at least one channel that extends from a radially inwardly-facing surface of the pilot hub to a chamber, wherein the pilot hub is connected to the seal plate utilizing a spline connection and a staking connection between an outer diameter of the pilot hub and an inner portion of the seal plate, wherein one or more splines are located on an inner diameter of the seal plate at the spline connection.

18. The torque converter of claim 17, wherein the at least one channel is extending from the radially inwardly-facing surface of the pilot hub to the chamber, wherein the chamber is bounded by the pilot hub and the cover.

19. The torque converter of claim 17, wherein the at least one channel is extending from the radially inwardly-facing surface of the pilot hub to the chamber, wherein the chamber is bounded by the seal plate and pilot hub.

* * * * *